(12) United States Patent
Ronen et al.

(10) Patent No.: US 6,230,116 B1
(45) Date of Patent: May 8, 2001

(54) APPARATUS AND METHOD FOR INTERACTING WITH A SIMULATED 3D INTERFACE TO AN OPERATING SYSTEM OPERATIVE TO CONTROL COMPUTER RESOURCES

(75) Inventors: Nir Ronen, Pardes Hanna; Ron Amihai, Ramat Hasharon, both of (IL)

(73) Assignee: Clockwise Technologies Ltd., Tel Aviv (IL)

(*) Notice: Subject to any disclaimer, the term of this patent is extended or adjusted under 35 U.S.C. 154(b) by 0 days.

(21) Appl. No.: 08/946,106

(22) Filed: Oct. 2, 1997

(51) Int. Cl.⁷ ........................................... G06F 9/455
(52) U.S. Cl. ............................. 703/22; 395/712
(58) Field of Search ........................... 395/500, 406, 395/712; 364/578; 345/340, 358; 703/22

(56) References Cited

U.S. PATENT DOCUMENTS

| | | | | |
|---|---|---|---|---|
| 5,452,468 | * | 9/1995 | Peterson | 305/419 |
| 5,590,267 | * | 12/1996 | Butler et al. | 345/340 |
| 5,666,504 | * | 9/1997 | Crutcher | 345/355 |
| 5,675,746 | * | 10/1997 | Marshall | 705/35 |
| 5,880,733 | * | 3/1999 | Horvitz et al. | 345/355 |

OTHER PUBLICATIONS

"Information Visualization Using 3D Interactive Animation", George G. Robertson, Jock D. Mackinlay, and Stuart K. Card, *Communications of the aCM*, Apr. 1993, vol. 36, No. 4, pp. 57–71.

"Rooms: The Use of Multiple Virtual Workfspaces to Reduce Space Contention in a Window–Based Graphical User Interface", D. Austin Henderson, Jr. and Stuart K. Card, *ACM Transactions of Grahics*, Jul. 1986, vol. 5 No. 3, pp. 210–243.

*Mastering Windows 3.1 Special Edition*, Robert Cowart, 1992.*

Josh White, Wiley & Sons, "Designing 3D Graphics", 1996, pp. 332–339.

Peter J. Kovach, *The Awesome Power Of Direct3D/DirectX*, Manning Publications Co., Ch. 10, "What About Collision Detection?" pp. 200–212.

* cited by examiner

*Primary Examiner*—Kevin J. Teska
*Assistant Examiner*—Dan Fiul
(74) *Attorney, Agent, or Firm*—Abelman, Frayne & Schwab

(57) ABSTRACT

A computer system including computer resources, an operating system operative to control said computer resources; and a 3D interface enabling a user to interact with the operating system and operative to provide a plurality of display representations of at least a portion of the computer resources from a corresponding plurality of different viewpoints.

20 Claims, 19 Drawing Sheets

FROM 740 (FIG. 11A)

750

SLIDE DOORS OPEN AS CAMERA APPROACHES THEM; LOAD PREDEFINED 3D MODEL (ROOM B) CORRESPONDS TO SON OF RESOURCE CORRESPONDING TO ROOM A; WHEN CAMERA POSITION MOVES FROM ROOM A (CURRENT ROOM) TO ROOM B, REDEFINE ORIGIN OF 3D VIRTUAL SCENE AS CENTER OF ROOM B.

ADJUST CAMERA POSITION COORDINATES ACCORDINGLY; UPDATE RESOURCE POINTER TO POINT TO RESOURCE CORRESPONDING TO ROOM B (WHICH IS SON OF RESOURCE CORRESPONDING TO ROOM A); resource_point_changed ← TRUE; DEFINE ROOM B AS CURRENT ROOM. (ROOM A)

FIG. 11B

APPARATUS AND METHOD FOR INTERACTING WITH A SIMULATED 3D INTERFACE TO AN OPERATING SYSTEM OPERATIVE TO CONTROL COMPUTER RESOURCES

FIELD OF THE INVENTION

The present invention relates to operating systems and methods pertaining thereto.

BACKGROUND OF THE INVENTION 3D games, such as Doom and Quake, are well known.

3D simulators, including RT3D (real time three dimensional) driving simulators, are known, such as Microsoft's Flight Simulator for Windows 95 and Mirage's ATF Flight Simulator.

CAD (computer-aided design) and CAM (computer-aided manufacturing) are both well-known 3D systems.

VRML (virtual reality modelling language) is described in Designing 3D Graphics, by Josh White, Wiley & Sons, 1996, as being "the first established, open standard for real-time 3D graphics on the Internet . . . It supports all the basic things we need: arbitrary 3DS-style meshes, textures, and lights . . . The addition of animation capabilities should make it a strong contender for a general purpose RT3D modelling file format standard." (pp. 332–333). VRML 1.0 and VRML 2.0 do not provide real time interactive objects in the virtual world and does not allow objects on screen to move freely.

Many different operating systems are known such as Windows 95 and other members of the Microsoft Windows family of operating systems, DOS, OS/2, and Unix. Conventional operating systems are described in PC Webopaedia, Sandy Bay Software, Inc., at http://www.pcwebopedia.com/index.html.

The disclosures of all publications mentioned in the specification and of the publications cited therein are hereby incorporated by reference.

SUMMARY OF THE INVENTION

The present invention seeks to provide a 3D operating system.

There is thus provided, in accordance with a preferred embodiment of the present invention, a computer system including computer resources, an operating system operative to control the computer resources, and a 3D interface enabling a user to interact with the operating system and providing at least one screen display image including a representation of at least a portion of the computer resources, wherein substantially all of the representation is three-dimensional.

Also provided, in accordance with another preferred embodiment of the present invention, is a computer system including computer resources, an operating system operative to control the computer resources, and a 3D interface enabling a user to interact with the operating system and operative to provide a plurality of display representations of at least a portion of the computer resources from a corresponding plurality of different viewpoints.

Still further in accordance with a preferred embodiment of the present invention, the 3D motion simulator is operative to generate the multiplicity of views in real time.

Additionally provided, in accordance with another preferred embodiment of the present invention, is operating system apparatus useful in conjunction with a population of computer systems each having a different configuration of computer resources, the apparatus including an operating system operative to control the computer resources, and a 3D interface enabling a user to interact with the operating system and operative to provide, for each specific computer system having a specific computer resource configuration, at least one 3D display representation of at least a portion of the specific computer resource configuration.

Further in accordance with a preferred embodiment of the present invention, the computer resource configuration includes at least one software resource and/or at least one hardware resource.

Further in accordance with a preferred embodiment of the present invention, the 3D interface includes a 3D motion simulator operative to provide a multiplicity of views of a 3D representation of the computer resources as seen from a corresponding multiplicity of viewpoints within the 3D representation of the computer resources, and a viewpoint selection receiver operative to receive a multiplicity of selected viewpoints from a user of the computer system, and wherein the 3D motion simulator generates views corresponding to the selected viewpoints.

Still further in accordance with a preferred embodiment of the present invention, the computer resources include applications.

Further in accordance with a preferred embodiment of the present invention, the viewpoints include at least two viewpoints within a 3D representation of at least one of the applications.

Still further in accordance with a preferred embodiment of the present invention, the computer resources have a logical structure and wherein the 3D representation includes a 3D representation of the logical structure.

Further in accordance with a preferred embodiment of the present invention, the logical structure includes a hierarchy.

Also provided, in accordance with a preferred embodiment of the present invention, is a computer system including computer resources, an operating system operative to control the computer resources, and a 3D interface enabling a user to interact with the operating system and providing a sequence of screen display images together generating a 3E representation of substantially all of the computer resources.

Further in accordance with a preferred embodiment ol the present invention, the computer system includes a first computer, such as a server, which includes the operating system, and a second computer which includes the 3D interface. Preferably, at least some of the computer resources are located in the first computer and/or at least some of the computer resources are located in computers served by the server.

Further provided, in accordance with still another preferred embodiment of the present invention, is a main computer system for controlling a plurality of computer resources residing in at least one second computers, the main computer apparatus including electronic storage apparatus including a computer resource database storing information regarding relationships between the plurality of computer resources, and an operating system accessing the computer resource database in order to manipulate the plurality of computer resources and including a computer resource transfer unit, such as an FTP (File Transfer Protocol) unit, operative to transfer at least one computer resource from the at least one second computers to the electronic storage apparatus.

Further in accordance with a preferred embodiment of the present invention, the electronic storage apparatus includes a ROM, such as a hard disk or a CD-ROM, and/or a RAM.

Additionally provided, in accordance with still another preferred embodiment of the present invention, is a method for interacting with an operating system operative to control computer resources, the method including providing at least one screen display image including a representation of at least a portion of the computer resources, wherein substantially all of the representation is three-dimensional, and receiving at least one user input provided by a user relative to the at least one screen display image and interacting with the operating system based on the at least one user input.

Further provided, in accordance with yet another preferred embodiment of the present invention, is a method for interacting with an operating system operative to control computer resources, the method including providing a plurality of display representations of at least a portion of the computer resources from a corresponding plurality of different viewpoints, and receiving at least one user input provided by a user relative to at least one of the plurality of display representations and interacting with the operating system based on the at least one user input.

Still further provided, in accordance with another preferred embodiment of the present invention, is a method for interacting with an operating system useful in conjunction with a population of computer systems each having a different configuration of computer resources, wherein the operating system is operative to control the computer resources, the method including providing, for each specific computer system having a specific computer resource configuration, at least one 3D display representation of at least a portion of the specific computer resource configuration, and receiving at least one user input provided by a user relative to at least one of the plurality of display representations and interacting with the operating system based on the at least one user input.

Also provided, in accordance with yet another preferred embodiment of the present invention, is a method for interacting with an operating system operative to control computer resources, the method including providing a sequence of screen display images together generating a 3D representation of substantially all of the computer resources, and receiving at least one user input provided by a user relative to at least one of the sequence of screen display images and interacting with the operating system based on the at least one user input.

Additionally provided, in accordance with yet another preferred embodiment of the present invention, is a method for interacting with a plurality of computer resources residing in at least one secondary computers, through a main computer, the method including providing a computer resource database in the main computer which stores information regarding relationships between the plurality of computer resources, and transferring at least one computer resource, selected by a user reliant on the computer resource database, from the at least one secondary computers to the main computer.

The term "database" is intended to include information, typically stored on an electronic storage device, in any format, typically but not necessarily in some type of hierarchical format, which may or may not be controlled by conventional database management or administration software. The term "database" generally refers to a collection of structured data which is typically independent of any particular application.

BRIEF DESCRIPTION OF THE DRAWINGS

The present invention will be understood and appreciated from the following detailed description, taken in conjunction with the drawings in which:

FIGS. 11A–11B, taken together, form a simplified flowchart illustration of a preferred method for performing the "update camera location" step of FIG. 7B;

DETAILED DESCRIPTION OF A PREFERRED EMBODIMENT

A "3D operating system" is a computerized system which includes a conventional operating system and a 3D user interface to that operating system.

An "operating system" is a system which resides in a general purpose computer and whose function is to run other programs, preferably including prevention of interference between concurrently running programs and concurrent users. Typically, the operating system is operative to perform one, some and preferably all of the following tasks: recognition of user input, sending output to a display screen, keeping track of files and directories on disk, controlling peripheral devices such as disk drives and printers, and maintaining security by ensuring that unauthorized users do not access the resources of the general purpose computer.

Classes of operating system include multi-user, multiprocessing, multitasking, multithreading and real-time.

Figure 1:
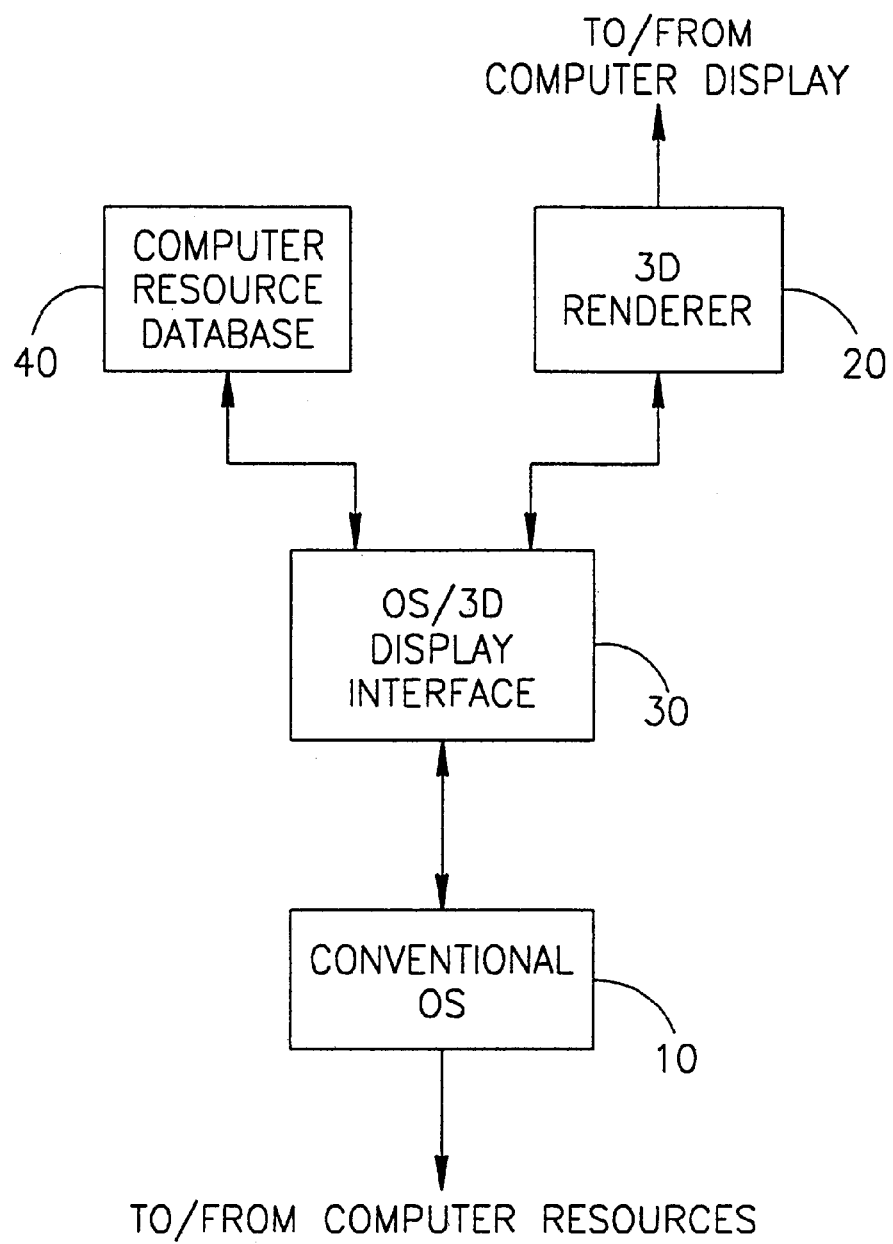
FIG. 1 is a simplified functional block diagram of a 3D operating system constructed and operative in accordance with a preferred embodiment of the present invention.

Reference is now made to FIG. 1 which is a simplified functional block diagram of a 3D operating system. The term "3D operating system is intended to include any operating system (OS) having a 3D user interface.

The computerized apparatus of FIG. 1 includes an operating system 10 operative to manage a plurality of computer resources typically although not necessarily having a hierarchy relationship between them.

As shown in FIG. 1, the 3D operating system typically comprises a conventional operating system 10, a 3D renderer 20, a OS/3D-display interface 30, interfacing between the 3D renderer 20 and the conventional operating system 10, and a computer resource database 40 serving the interface unit 30.

The computer resource database 40 typically stores information defining a structural relationship between the computer resources managed by the conventional operating system 10. Some or all of this structural relationship may merely reflect an existing structural relationship between the computer resources which is imposed by the operating system. Alternatively, some or all of the structural relationship defined by the computer resource database may be unrelated to, or go beyond, any existing structural relationship imposed by the operating system.

Figure 4A:
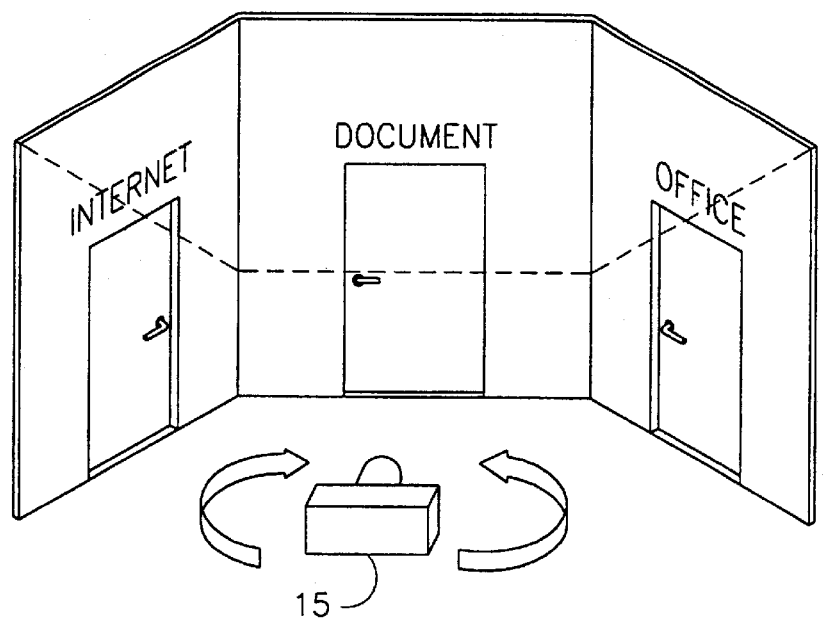
FIG. 4A is an illustration of an initial projection, i.e. a projection into 2D, from an initial point of view, of a 3D virtual scene including a 3D representation of relationships between computer resources.
Figure 4B:
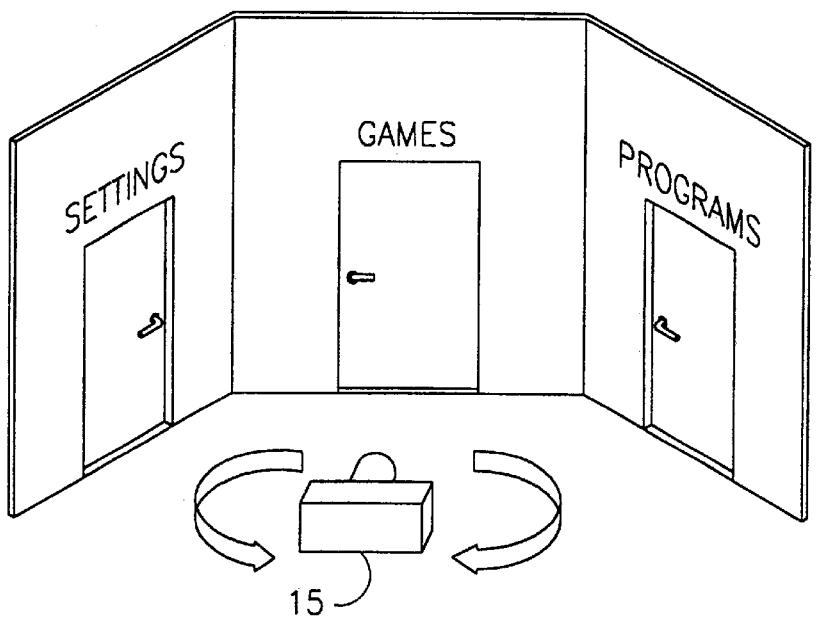
FIG. 4B is an illustration of another initial projection, i.e. a projection into 2D, of the same 3D virtual scene including a 3D representation of relationships between computer resources, the projection being taken from the same point of view (e.g. the center of a hexagonal space) but looking in a different direction, e.g. the opposite direction.

The apparatus of FIG. 1 is operative to provide a 3D virtual scene including a 3D representation of relationships between computer resources (not shown) managed by the conventional operating system 10. The user's interaction with the computer resources is represented as motion of a "point of view" of the 3D virtual scene, also termed herein "camera 15" (FIGS. 4A–4B).

The 3D renderer 20 is operative to render the 3D virtual scene. Typically, the renderer 20 generates a 2D image on a computer screen display comprising a perspective 3D-to-2D projection of the 3D virtual scene. Typically, the 2D screen display image is updated by the renderer to reflect changes in the point of view from which the user views the 3D virtual scene.

Typically, updating is done in real time such that the user sees the changes in point of view as he effects these changes. The 3D renderer may, for example, comprise a RenderWare API (application programming interface) commercially available from Criterion Software Ltd., or a Direct3D, commercially available from Microsoft.

The OS/3D interface 30 is operative to monitor user-initiated motion of camera 15 within the 3D virtual scene. Camera motion is typically implemented by motion of a user input device such as a mouse.

For example, when a user moves a mouse from one screen location to another, this generates "camera motion", in that the user's old "point of view" is replaced by a new "point of view" in which computer resources which were previously out of sight now come into the field of view whereas computer resources which were previously visible now exit the field of view.

When camera motion is detected by the OS/3D interface 30, the computer display image is updated to correspond to the new point of view. Typically, the OS/3D interface 30 accesses computer resource database 40 to retrieve newly visible computer resources. The OS/3D interface 30 then typically controls 3D renderer 20 to generate a new screen display image including a 3D representation of the newly visible computer resources.

The OS/3D interface 30 also converts user selections of computer resources into commands to the operating system 10. For example, the computer resources managed by the operating system may include a wordprocessor such as MS-Word and the 3D virtual world may include a 3D typewriter object which represents MS-Word. When the user clicks on the 3D typewriter object, the OS/3D interface typically issues the following command to the operating system lo:

"execute MS-Word".

According to one embodiment of the present invention, the computer resource database may comprise a tree having a subtree representing the programs section under MS-Windows 95.

Figure 2:
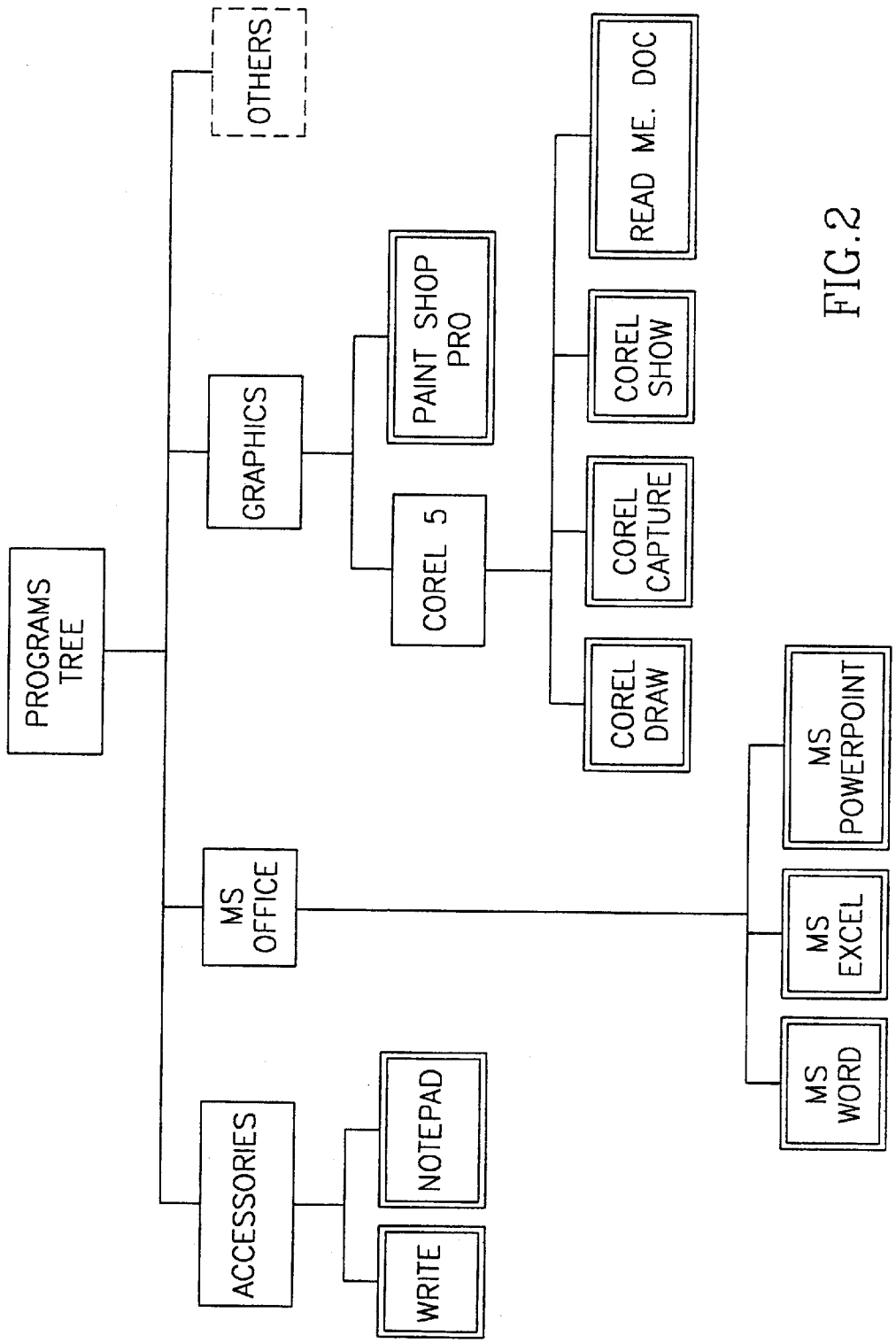
FIG. 2 is an example of the structure of the programs section of a typical array of computer resources defined within a MS-Windows 95 operating system.

FIG. 2 is an example of the structure of the programs section of a typical array of computer resources defined within a MS-Windows 95 operating system.

Figure 3:
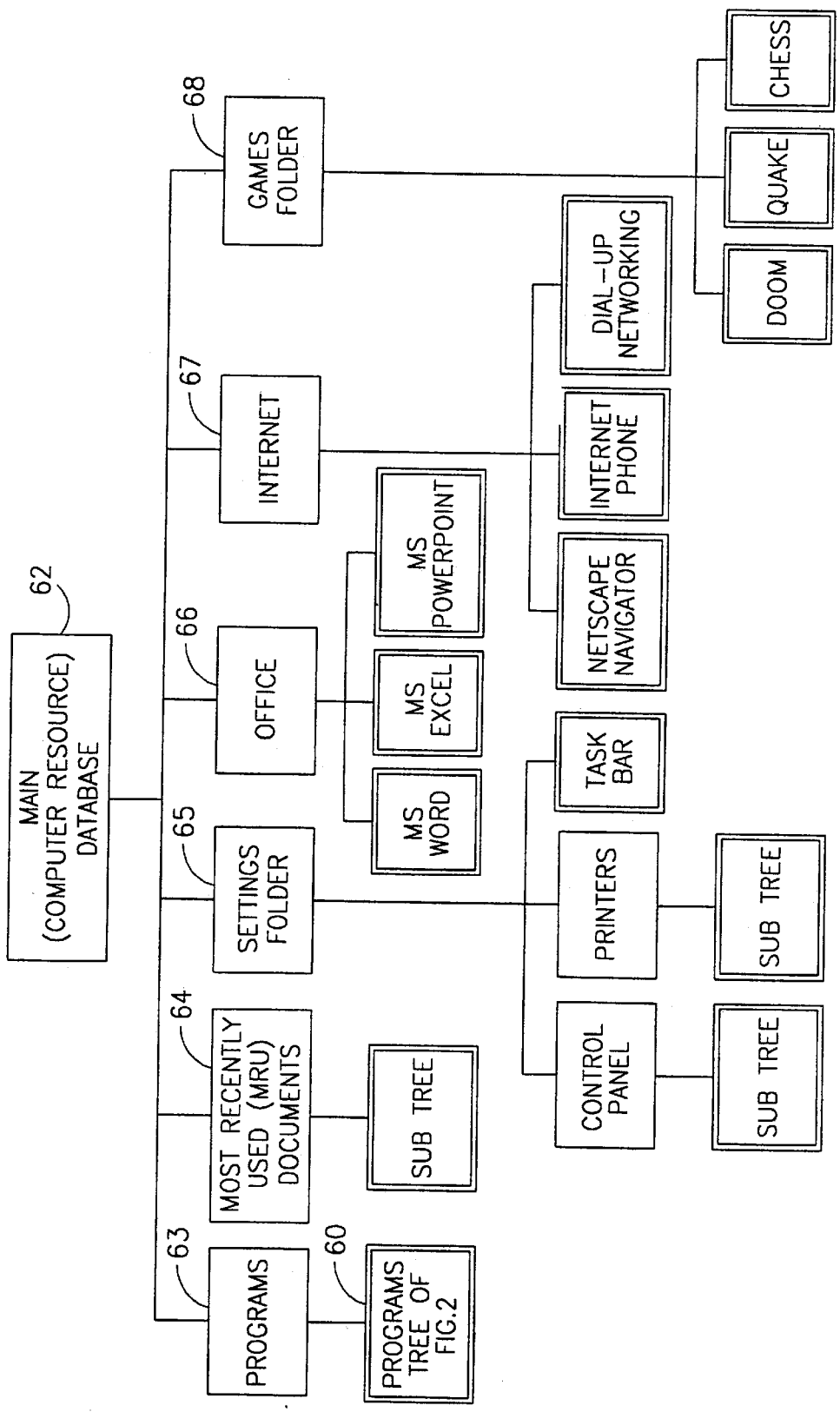
FIG. 3 is an illustration of a computer resource database including, inter alia, a main folder, a tree having a subtree representing the programs section of FIG. 2 and also including other folders which are descendants of the main folder.

FIG. 3 is an illustration of a computer resource database including a tree having a subtree 60 representing the same programs section. For example, the database 40 may be generated by analyzing the Windows 95 registry, if the operating system is Windows 95. The database 40 may alternatively be generated by scanning all drives (hard disks, floppy disks and CD-ROMs), directory by directory. As shown, the computer resource database of FIG. 3 has a hierarchical structure in that it includes a main folder 62 having the following sons (some of which themselves have sons): a programs folder 63, a most recently used documents folder 64, a settings folder 65, an office folder 66, an Internet folder 67 and a games folder 68. It is appreciated, of course, that the computer resource database of FIG. 3 is merely exemplary of essentially limitless possible structures of computer resource database 10.

FIG. 4A is an illustration of an initial projection, i.e. a projection into 2D, from an initial point of view, of a 3D virtual scene including a 3D representation of relationships between the computer resources of FIG. 3. FIG. 4B is an illustration of another initial projection, i.e. a projection into 2D, of the same 3D virtual scene including a 3D representation of relationships between computer resources, the projection being taken from the same point of view (e.g. the center of a hexagonal space) but looking in a different direction, e.g. the opposite direction.

As shown, the sibling relationship between six folders (Internet, Documents, Office, Settings, Games and Programs) is illustrated by representing the six folders as six respective doors on six respective walls of an initial hexagonal room. Three of the doors are visible when looking in the direction of FIG. 4A and the remaining three doors are visible when looking in the direction of FIG. 4B.

It is appreciated that, alternatively, the doors may be otherwise arranged, e.g. as doors along one or both sides of a corridor or any other shape of room including a circular room. Furthermore, the computer resources need not be represented as elements of a building or set of buildings (rooms, doors, etc.) but alternatively may be represented as elements of any other typically hierarchical 3D scene. For example, the 3D scene may comprise one or more solar systems, whose sons are planets and whose grandsons are moons. In this case, folders may be represented as planets and applications as moons. An imaginary solar system may be used to provide more than 3 hierarchical layers, in which even moons have "sub-moons" and sub-moons have "sub-sub-moons", etc. Alternatively, the 3D system may comprise a bio-system typically hierarchical relationships such as a jungle with multiple trees, the trees having with multiple branches, the branches having multiple leaves, etc. Essentially any illustratable 3D scene, which preferably has an illustratable hierarchical structure is suitable paradigm for displaying a user's journey among computer resources.

Figure 5A:
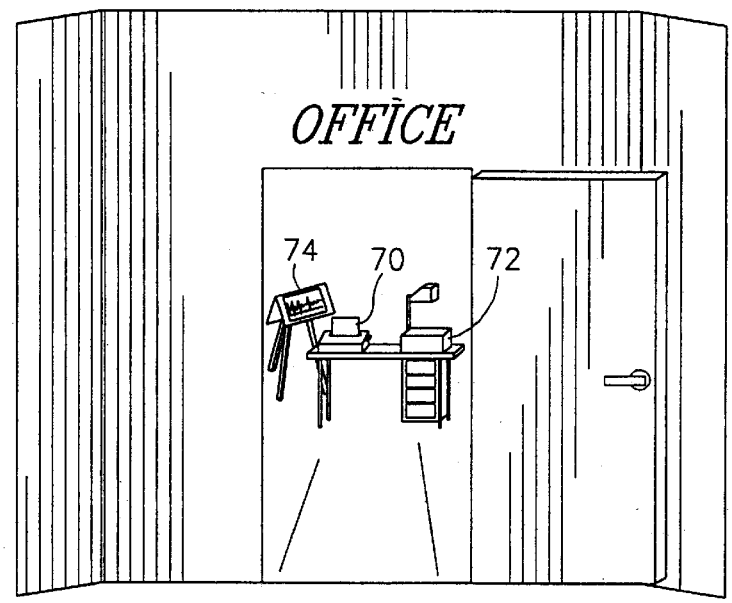
FIG. 5A is an illustration of the virtual scene after a user has come close enough to the "office" door to enable the system to discern that the user wishes to select "office" and consequently, to open the "office" door.

FIG. 5A is an illustration of the virtual scene after a user has come close enough to the "office" door, typically as judged by a system-determined closeness criterion, to enable the system to discern that the user wishes to select "office". As shown, the "office" door is now open, unlike in FIG. 4A, and inside the "office" room there are 3 objects, namely a typewriter 70, an overhead projector 72 and an easel 74, being pictorial representations of the following applications: Word 95, PowerPoint and Excel.

Figure 5B:
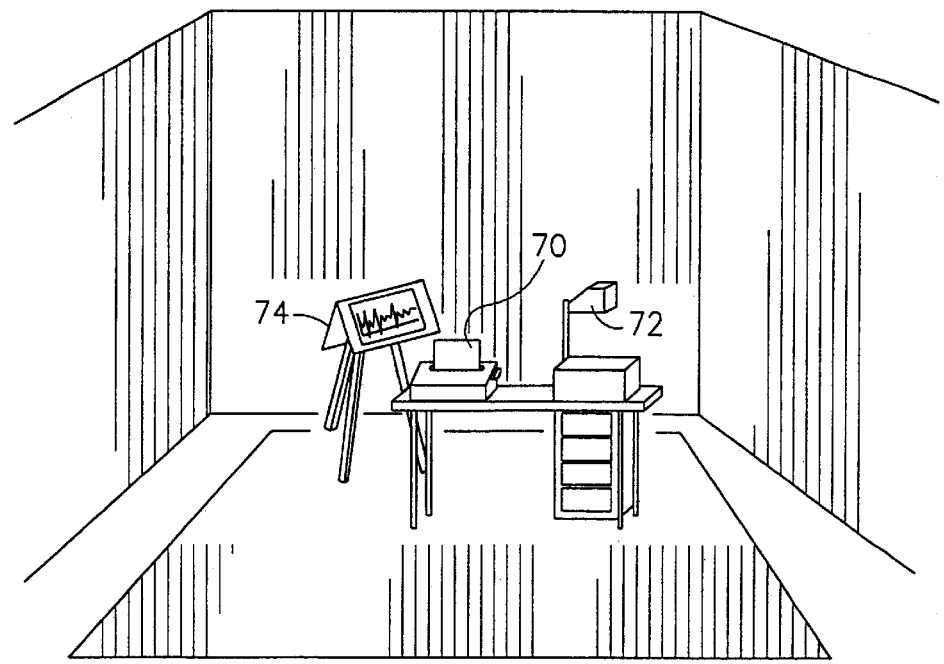
FIG. 5B is an illustration of a new projection, i.e. a projection into 2D, from a new point of view, of the 3D virtual scene shown in part in FIGS. 4A–4B, wherein the new point of view is within one of the rooms whose entry doors are illustrated in FIGS. 4A–4B.

FIG. 5B is an illustration of a new projection, i.e. a projection into 2D, from a new point of view, of the 3D virtual scene shown in part in FIGS. 4A–4B, wherein the new point of view is within the "office" room.

Figure 5C:
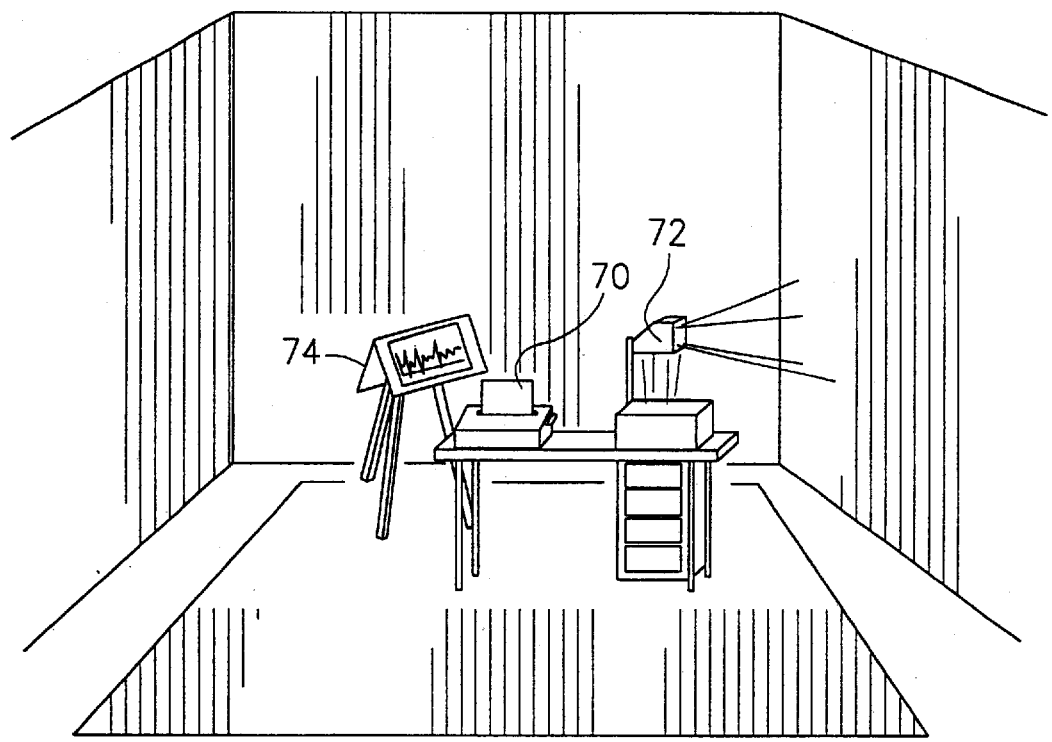
FIG. 5C is an illustration of the 3D scene from the same point of view and in the same camera direction as in FIG. 5B, wherein the 3D scene has changed in that an object has been selected and an animation of that object is being performed in order to confirm that selection.

Typically, the user may select an individual object e.g. by double-clicking on the individual object with a mouse. This object selection is interpreted by the system of the present invention as a request to interact with (run, edit, rename, delete, etc.) the application represented by that object. Preferably, the system confirms each object selection e.g. by initiating an animation of that object. For example, selection of the overhead projector 72 (corresponding to PowerPoint) may be confirmed, as shown in FIGS. 5B–5C, by flashing the light of the image of the overhead projector on and off.

Figure 6A:
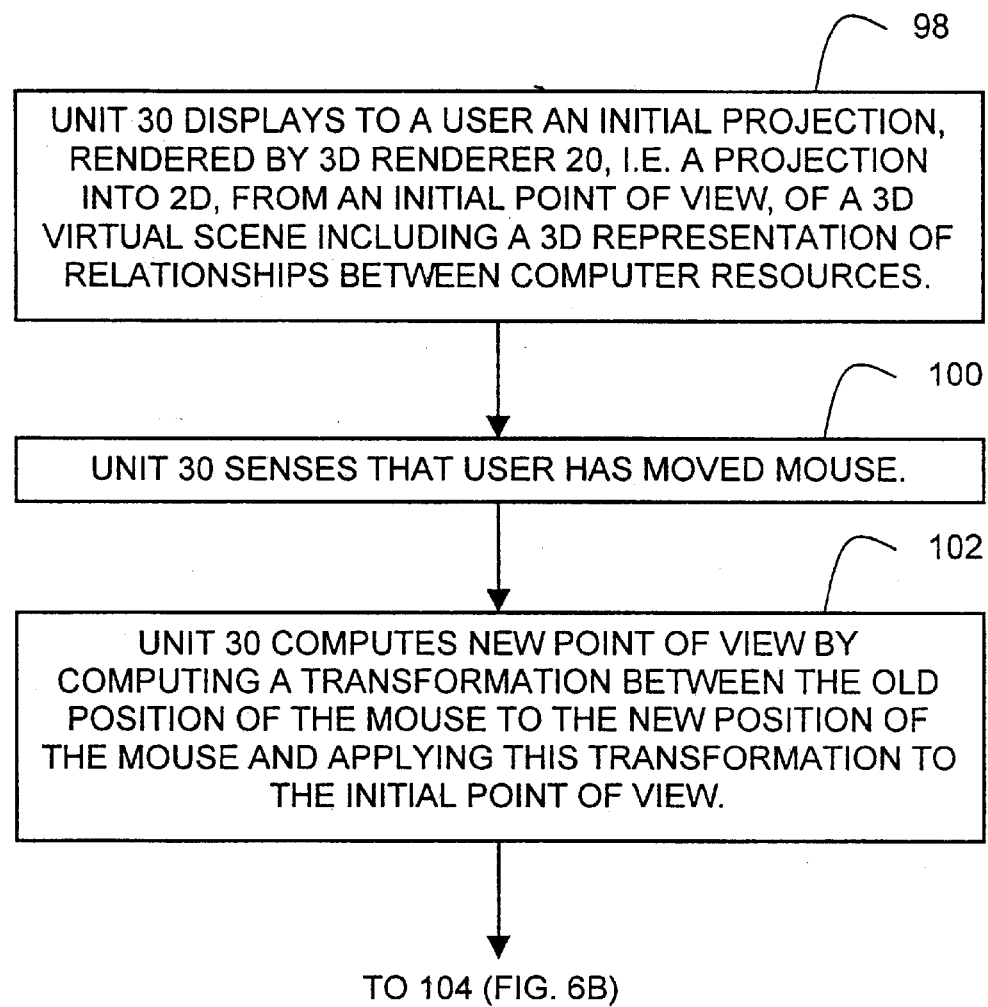
FIGS. 6A–6B, taken together, form a simplified flowchart illustration of a preferred method of operation for a 3D operating system constructive and operative in accordance with a preferred embodiment of the present invention.
Figure 6B:
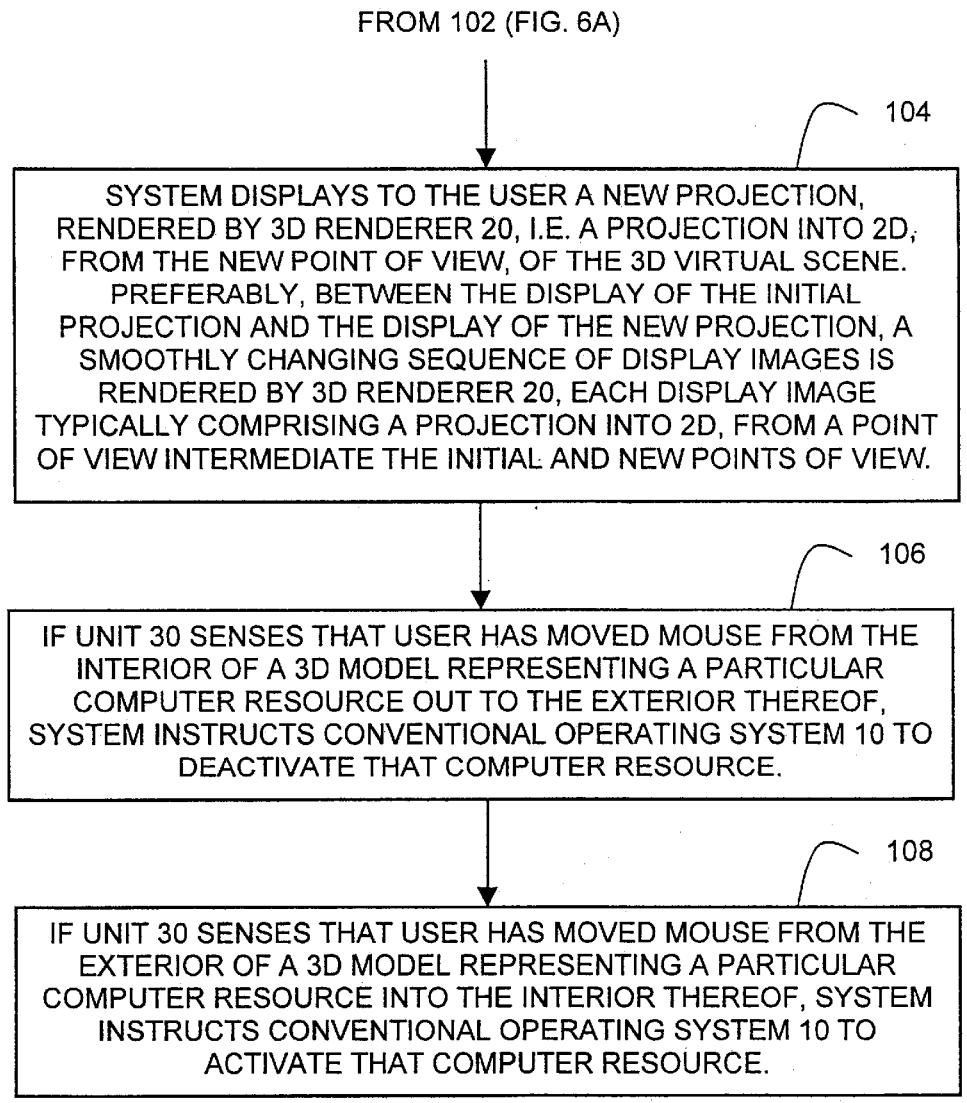

FIGS. 6A–6B, taken together, form a simplified self-explanatory flowchart illustration of a preferred method of operation of a 3D operating system constructive and operative in accordance with a preferred embodiment of the present invention.

Figure 7A:
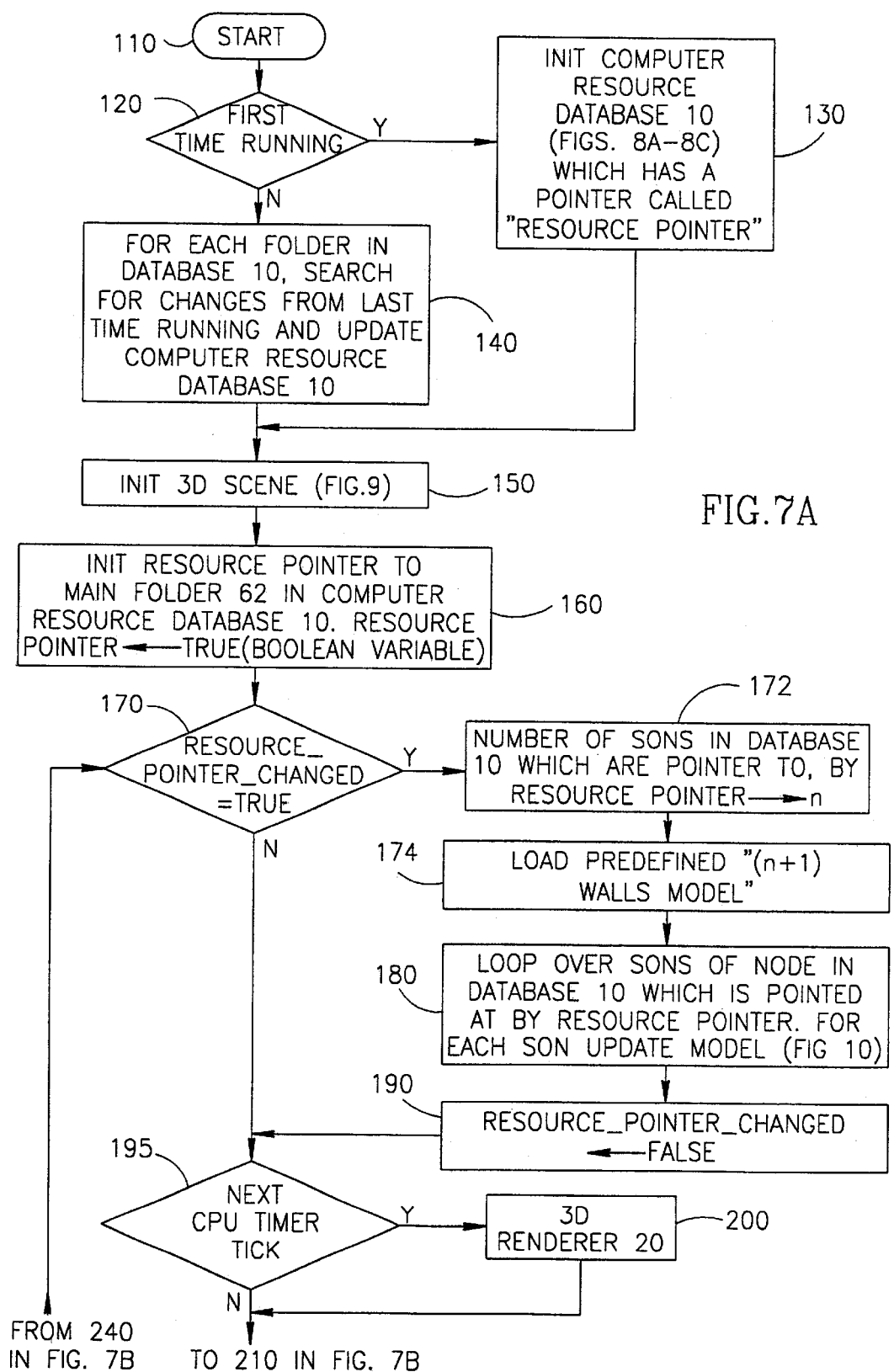
FIGS. 7A–7B, taken together, form a simplified flowchart illustration of a preferred method of operation for a particular implementation of a 3D operating system which is useful in conjunction with a conventional Windows 95 operating system.
Figure 7B:
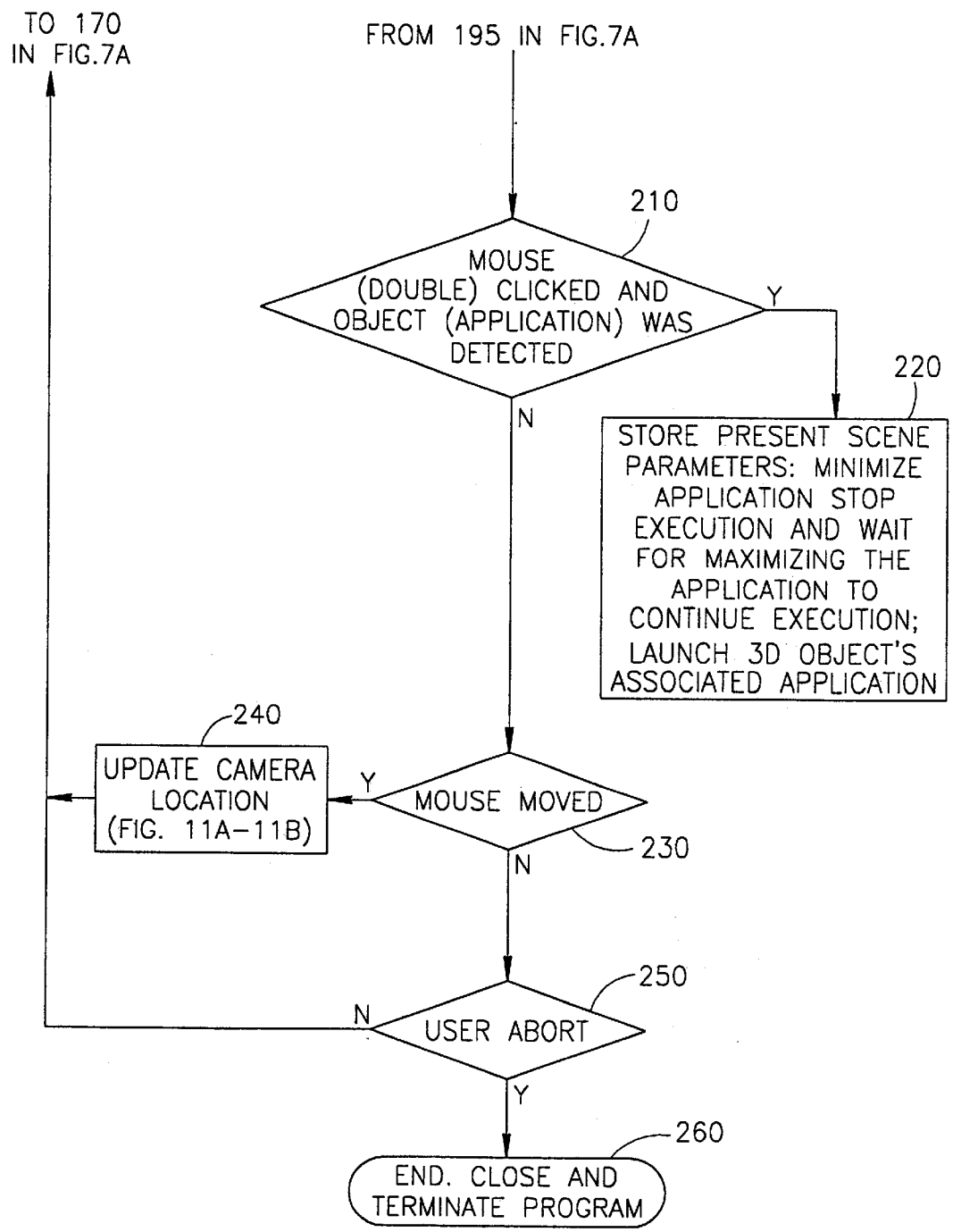

FIGS. 7A–7B, taken together, form a simplified self-explanatory flowchart illustration of a preferred method of operation for a particular implementation of a 3D operating system which is useful in conjunction with a conventional Windows 95 operating system. All of the steps of FIGS. 7A–7B are typically performed by unit 30 of FIG. 1 unless otherwise indicated.

Figure 8A:
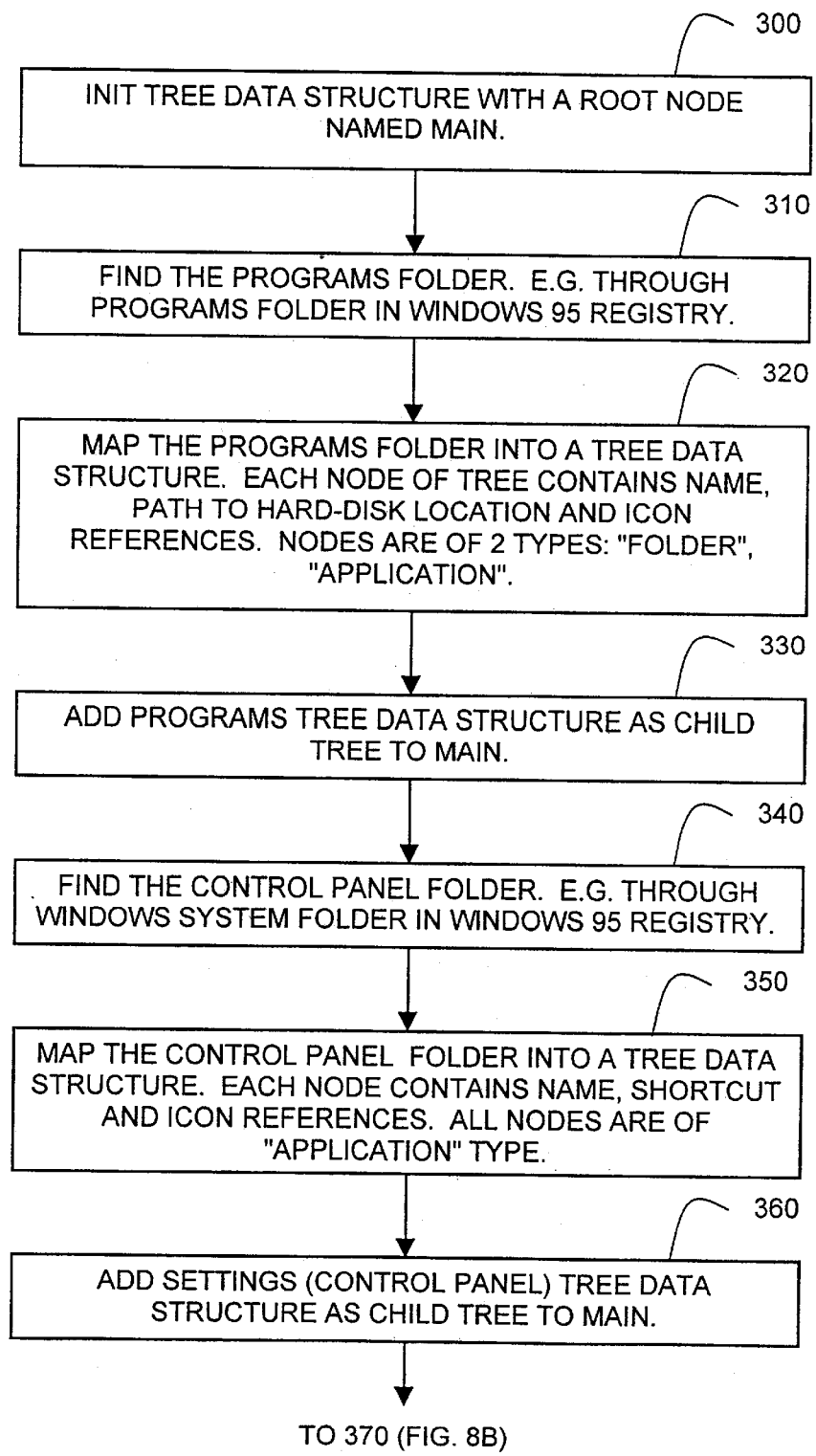
FIGS. 8A–8C, taken together, form a simplified flowchart illustration of a preferred method for performing the "init computer resource database" step of FIGS. 7A–7B.
Figure 8B:
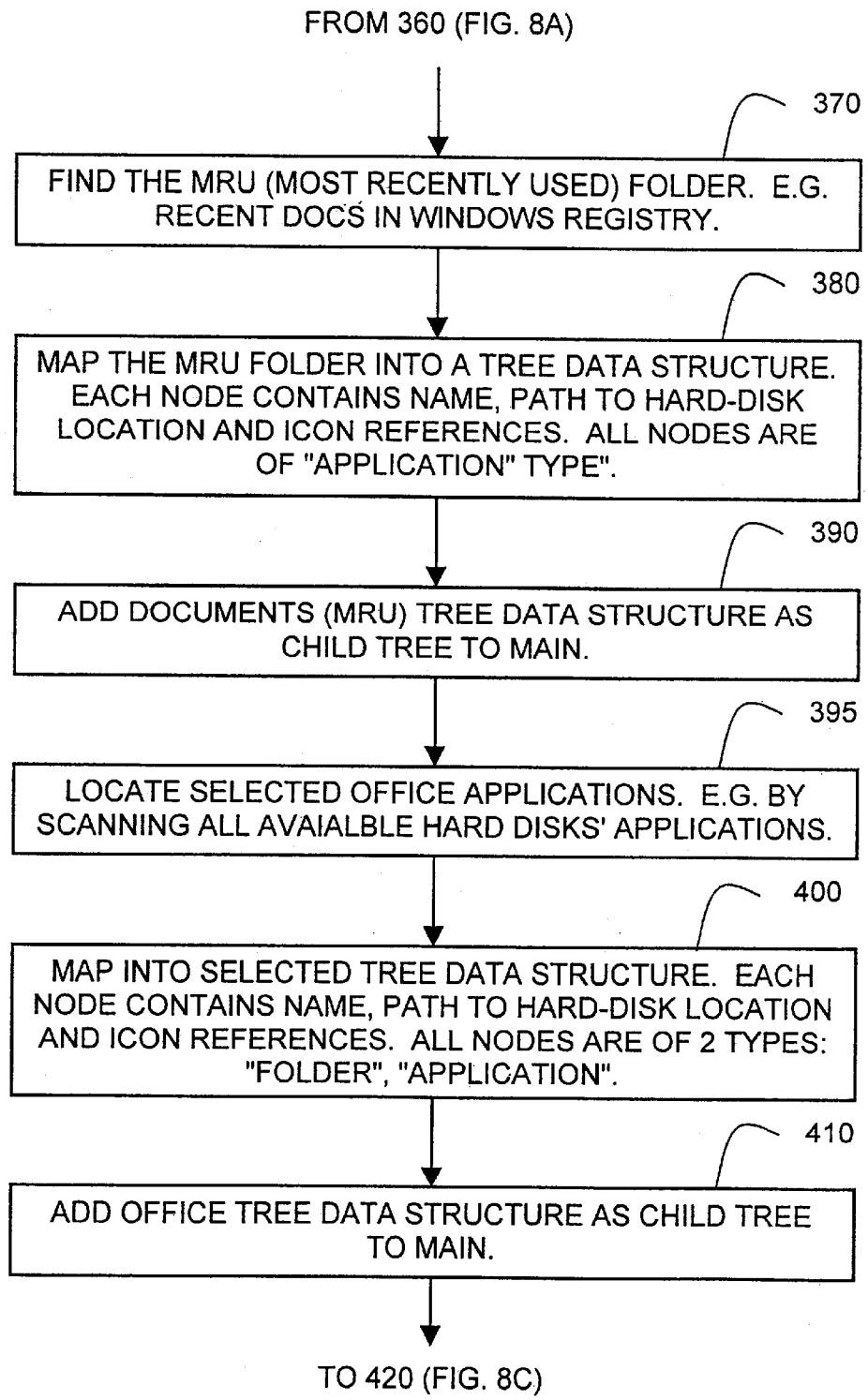
Figure 8C:
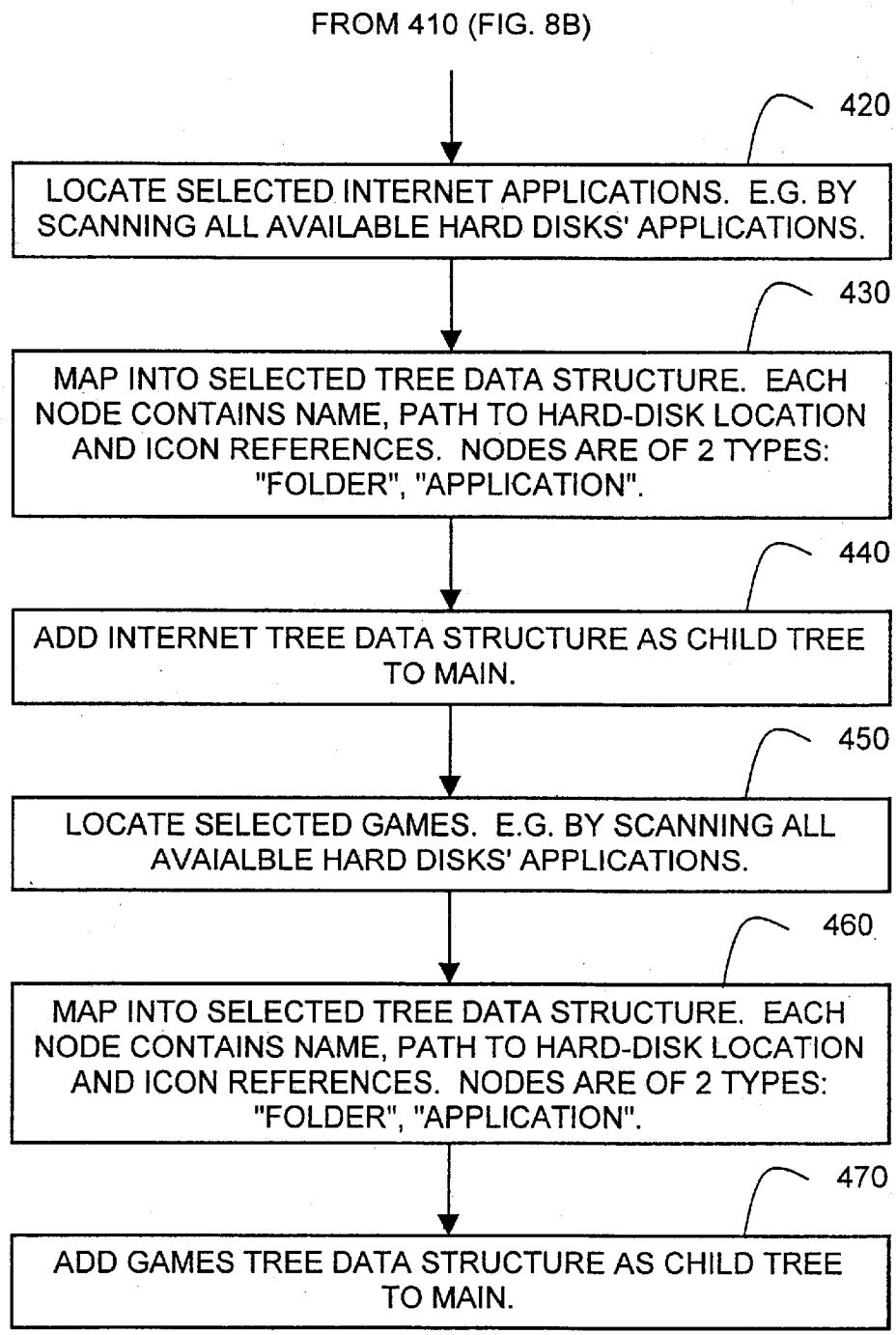

FIGS. 8A–8C, taken together, form a simplified flowchart illustration of a preferred method for performing the "init computer resource database" step 130 of FIGS. 7A–7B in which a computer resource database is generated which represents the relationships between a set of computer resources. It is appreciated that the method of FIGS. 8A–8C is useful even in situations in which less than all of the set of computer resources are actually available or in situations in which less than all of the set of computer resources are actually on-line.

An example of a tree data structure as generated in step 330 is shown in FIG. 2. In FIG. 2 and in FIG. 3, folder-type nodes are included in a "single" box and application-type nodes are included in a "double" box.

Typically, the tree structures of the programs folder, control panel folder, and MRU folder are all available from Windows 95. In contrast, the tree structures of the Office folder, Games folder and Internet folder are typically not available from Windows 95 and typically are determined by designer's choice.

Figure 9:
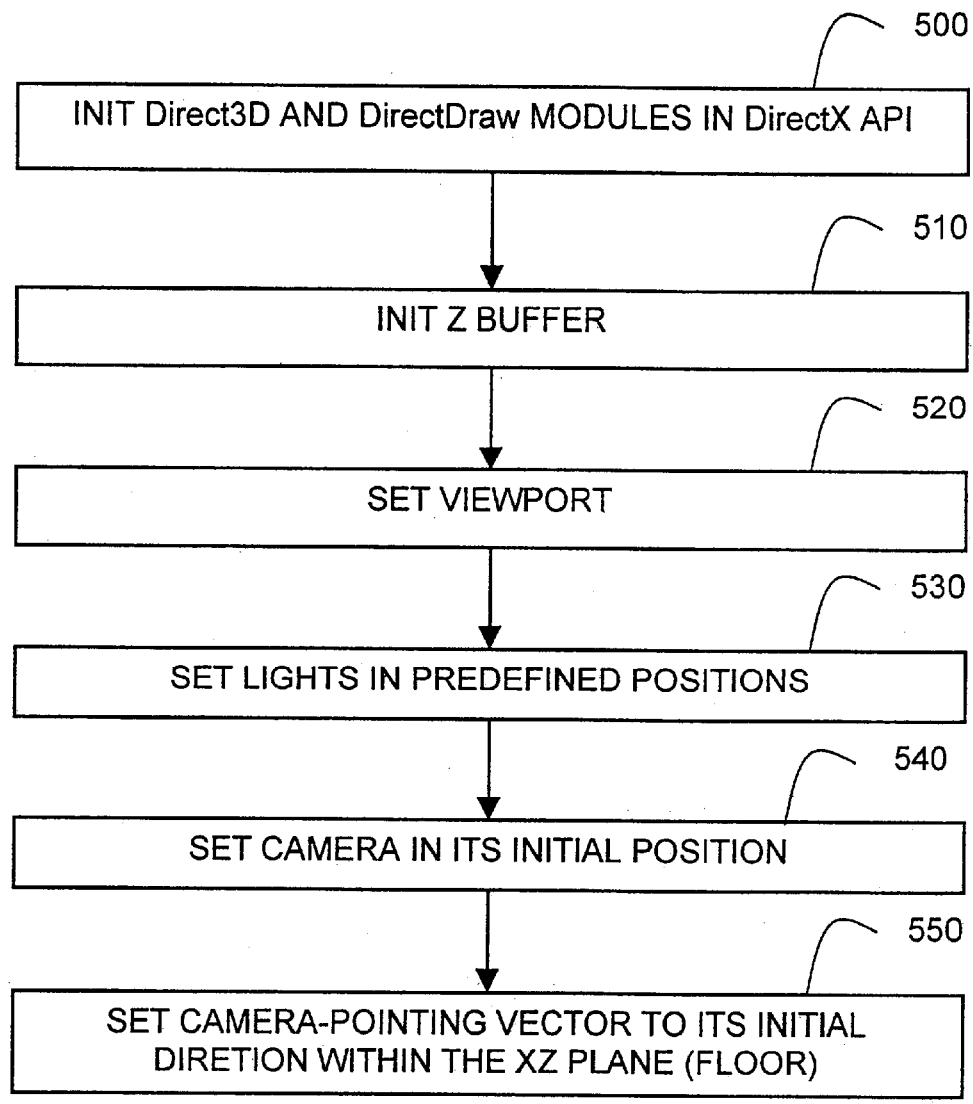
FIG. 9 is a simplified flowchart illustration of a preferred method for performing the "init 3D scene" step of FIG. 7A.

FIG. 9 is a simplified self-explanatory flowchart illustration of a preferred method for performing the "init 3D scene" step 150 of FIG. 7A.

Figure 10:
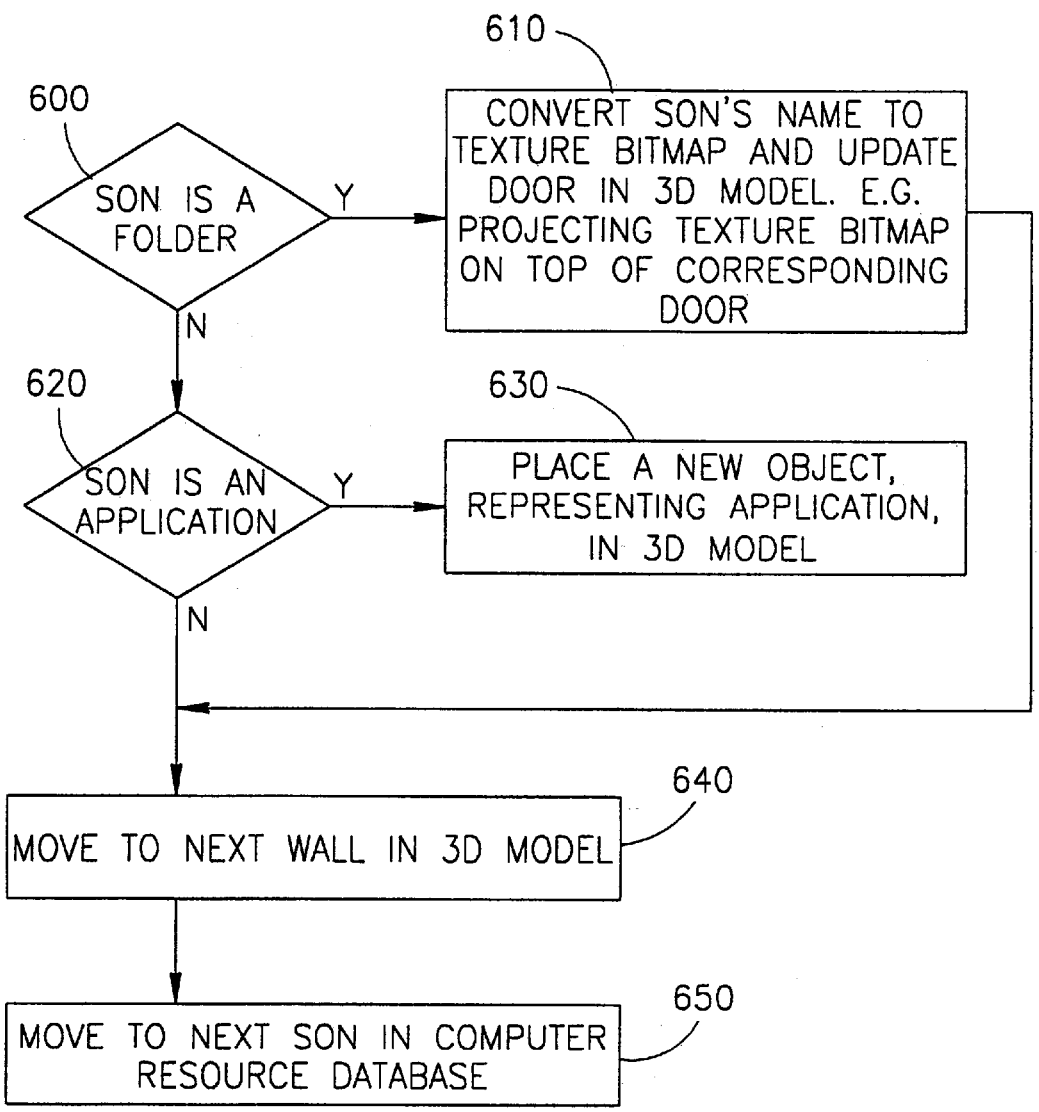
FIG. 10 is a simplified flowchart illustration of a preferred method for performing the update model step performed, in FIG. 7A, for each of the sons of a current node in database 10.

FIG. 10 is a simplified flowchart illustration of a loop which is preferably performed, in step 180 of FIG. 7A, for each of the sons of the database 40 node pointed at by the Resource pointer. In step 650, a new object is projected into the 3D virtual model, wherein the new object represents the application. For example, in FIG. 5A, the overhead projector is an example of an object which represents a particular application, namely PowerPoint. The new object may be projected onto any suitable location within the 3D virtual model. For example, as implemented in step 174 of FIG. 7A, if a folder includes 3 applications and 3 other folders, the portion of the virtual scene representing the folder may comprise a hexagonal room having 6 walls, 3 of the walls including doors corresponding to the 3 folders respectively. 3 objects representing the 3 applications respectively may be projected adjacent the 3 remaining walls respectively.

It is emphasized that FIG. 10 is an implementation suitable for one particular embodiment of the present invention in which nodes in the tree structure of the computer resource database are represented by walls, and there are two types of nodes: parents and leaves (also termed herein "folders" and "applications", respectively). Parents are represented by doors in the appropriate walls and sons are represented by objects adjacent the appropriate doors, e.g. objects inside a room whose entry door is the door representing the parent. However, it is appreciated that many alternative schemes of illustrations may be employed.

An application may be represented by any element of the 3D virtual world and not necessarily by an object. For example, an application may be represented by a hall connecting two or more rooms. Another example is that an application may be represented by a room and commands or other elements within the application may be represented by objects within the room. For example, Word may be represented by a room and Rename, Edit and other commands within Word may be represented by objects within the room representing Word.

Figure 11A:
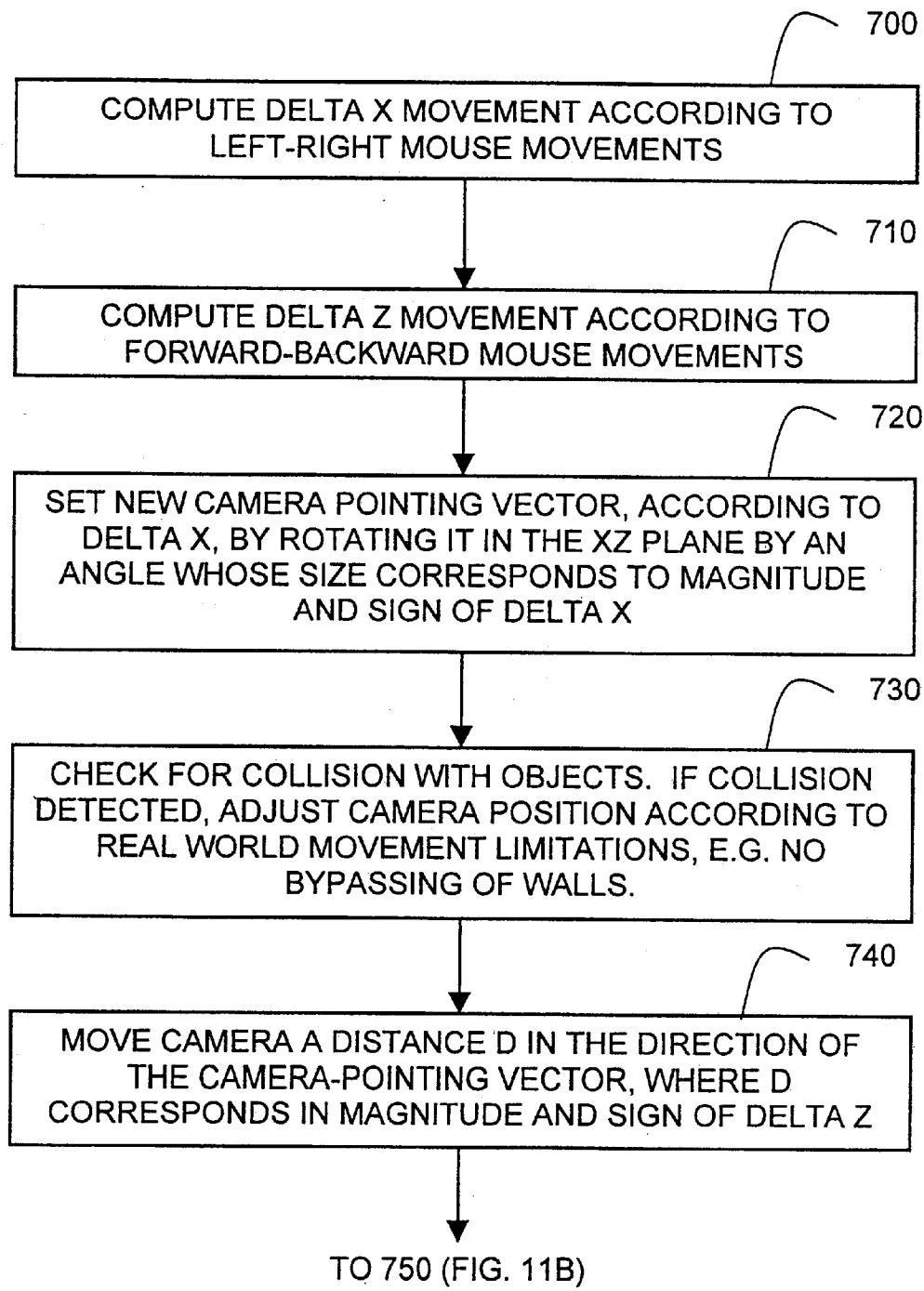

FIGS. 11A–11B, taken together, form a simplified flowchart illustration of a preferred method for performing the "update camera location" step 240 of FIG. 7B. Any suitable collision detection method may be used to implement step 740 of FIGS. 11A–11B, such as the method described in the following reference:

Peter J. Kovach, *The awesome power of Direct3D/DirectX*, Manning Publications Co., Ch. 10, "What about collision detection?", pp. 200–212.

Figure 12A:
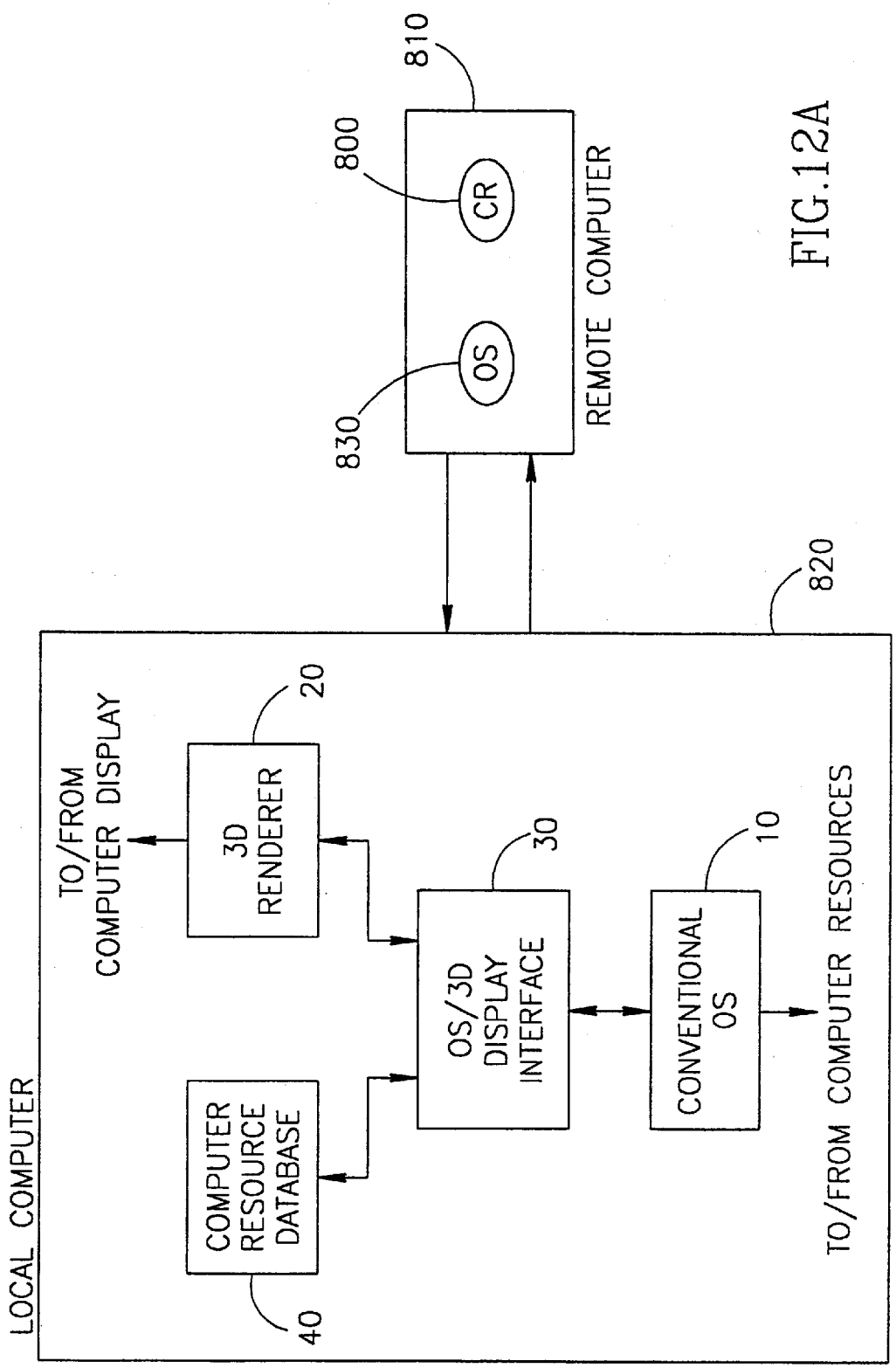
FIG. 12A is a simplified block diagram of a first modification of the present invention in which at least a portion of the computer resources are located in a remote computer whereas a local computer 820 includes some or all of the apparatus of FIG. 1.

FIG. 12A illustrates a first modification of the embodiment as shown in the previous figures in which at least a portion 800 of the computer resources are located in a remote computer (server) 810 whereas a local computer (client) 820 includes the apparatus of FIG. 1. The apparatus of FIG. 1 may control resources 800 in remote computer 810 by any suitable means such as using FTP (file transfer protocol) to transfer resources 800 from the remote computer 810 to the local computer 820 via a network associated with an operating system 830 in the remote computer. Some of the computer resources may also reside in local computer 820.

Figure 12B:
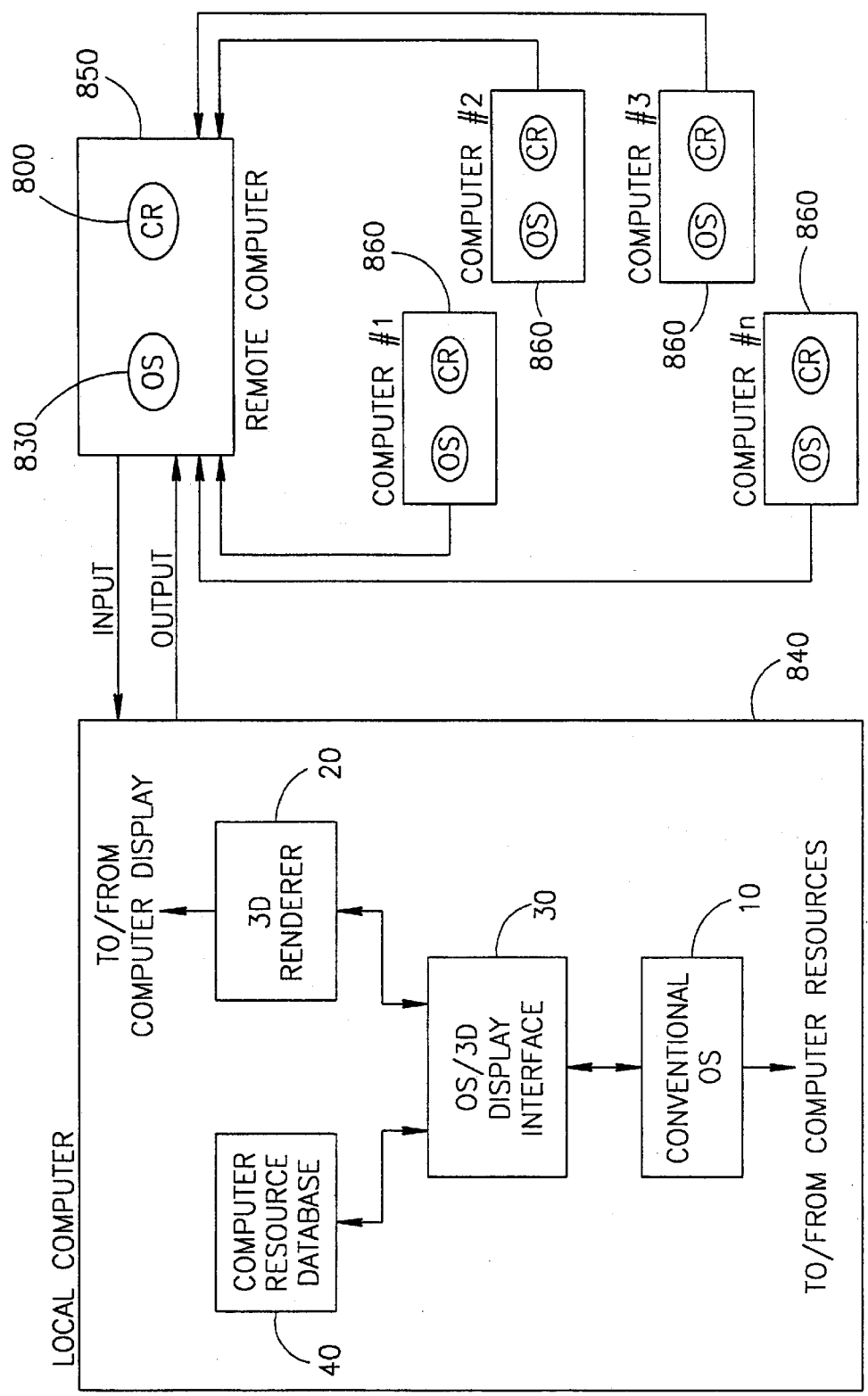
FIG. 12B illustrates another modification of the present invention in which some or all of the apparatus of FIG. 1 resides in a local computer whereas a remote computer associated with the local computer controls an array of n auxiliary computers in which reside computer resources controlled by the apparatus of FIG. 1.

FIG. 12B illustrates another modification of the embodiment as shown in the previous figures in which the apparatus of FIG. 1 resides in a local computer (client) 840 whereas a remote computer (server) 850 controls an array of n auxiliary computers 860. The resources of the n auxiliary computers are controlled by the apparatus of FIG. 1 via a network or other suitable communication medium connecting local computer 840 to remote computer 850 and connecting remote computer 850 to auxiliary computers 860. Some of the computer resources controlled by the apparatus of FIG. 1 may also reside in local computer 820 and/or in remote computer 850.

It is appreciated that any suitable user input device may be employed in conjunction with the apparatus and methods shown and described herein, including but not limited to a 2D or 3D wired or cordless mouse, keyboard, joystick, light-pens, voice recognition devices, and virtual reality accessories such as virtual reality gloves.

It is appreciated that the software components of the present invention may, if desired, be implemented in RAM (random access memory) and/or ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove.

Rather, the scope of the present invention is defined only by the claims that follow:

What is claimed is:

1. A computer system comprising:
   computer resources;
   an operating system operative to control said computer resources; and
   a 3D interface enabling a user generating camera motion to interact with the operating system and providing at least one screen display image of a 3D virtual scene including a simulated three-dimensional representation of at least a portion of the computer resources, said interface configured to be operative to monitor said camera motion and to determine which of said computer resources are visible in said display image.

2. A computer system according to claim 1 wherein said 3D interface comprises:
   a 3D motion simulator operative to provide a multiplicity of views of a simulated 3D representation of the computer resources as seen from a corresponding multiplicity of viewpoints within the simulated 3D representation of the computer resources; and
   a viewpoint selection receiver operative to receive a multiplicity of selected viewpoints from a user of the computer system,
   wherein the 3D motion simulator generates views corresponding to said selected viewpoints.

3. A computer system according to claim 2 wherein said 3D motion simulator is operative to generate said multiplicity of views in real time.

4. Operating system apparatus useful in conjunction with a population of computer systems each having a different configuration of computer resources, the apparatus comprising:
   an operating system operative to control said computer resources; and
   a 3D interface enabling a user generating camera motion to interact with the operating system and operative to provide, for each specific computer system having a specific computer resource configuration, at least one display image of a 3D virtual scene including a simulated three-dimensional representation of at least a portion of said specific computer resource configuration, said interface configured to be operative to monitor said camera motion and to determine which of said computer resources are visible in said display image.

5. Apparatus according to claim 4 wherein said computer resource configuration includes at least one software resource.

6. Apparatus according to claim 4 wherein said computer resource configuration includes at least one hardware resource.

7. Apparatus according to claim 4 wherein said 3D interface comprises:
   a 3D motion simulator operative to provide a multiplicity of views of a simulated 3D representation of the computer resources as seen from a corresponding multiplicity of viewpoints within the simulated 3D representation of the computer resources; and
   a viewpoint selection receiver operative to receive a multiplicity of selected viewpoints from a user of the computer system,
   wherein the 3D motion simulator generates views corresponding to said selected viewpoints.

8. A system according to claim 1 wherein said computer resources include applications.

9. A system according to claim 2 wherein said viewpoints comprise at least two viewpoints within a simulated 3D representation of at least one of said applications.

10. A system according to claim 1 wherein said computer resources have a logical structure and wherein said simulated 3D representation comprises a simulated 3D representation of said logical structure.

11. A system according to claim 10 wherein said logical structure comprises a hierarchy.

12. A computer system comprising:
    computer resources;
    an operating system operative to control said computer resources; and
    a 3D interface enabling a user generating camera motion to interact with the operating system and providing a sequence of display images of a 3D virtual scene together generating a simulated three-dimensional representation of said computer resources, said interface configured to be operative to monitor said camera motion and to determine which of said computer resources are visible in said display image.

13. A computer system according to claim 1 wherein said computer system comprises:
    a fist computer which includes said operating system; and a second computer which comprises said 3D interface, wherein said second computer communicates with said first computer.

14. A system according to claim 13 wherein said first computer comprises a server.

15. A system according to claim 13 wherein at least some of said computer resources are located in said first computer.

16. A system according to claim 14 wherein at least some of said computer resources are located in computers served by said server.

17. A method for interacting with an operating system operative to control computer resources, the method comprising:

providing at least one screen display image of a 3D virtual scene including a simulated three-dimensional representation of at least a portion of the computer resources;

monitoring camera motion generated by a user and determining based on said camera motion which of said computer resources are visible in said display image; and receiving at least one user input provided by said user relative to said at least one screen display image and interacting with the operating system based on said at least one user input.

18. A method for interacting with an operating system useful in conjunction with a population of computer systems each having a different configuration of computer resources, wherein the operating system is operative to control the computer resources, the method comprising:

providing, for each specific computer system having a specific computer resource configuration, at least one display image of a 3D virtual scene including a simulated three-dimensional representation of at least a portion of said specific computer resource configuration;

monitoring camera motion generated by a user and determining based on said camera motion which resources of said specific computer resource configuration are visible in said display image; and receiving at least one user input provided by said user relative to said at least one said plurality of display representations and interacting with the operating system based on said at least one user input.

19. A method for interacting with an operating system operative to control computer resources, the method comprising:

providing a sequence of screen display images of a 3D virtual scene together generating a simulated 3D representation of said computer resources;

monitoring camera motion generated by a user and determining based on said camera motion which of said computer resources are visible in said display images; and receiving at least one user input provided by said user relative to at least one of said sequence of screen display images and interacting with the operating system based on said at least one user input.

20. A 3D interface to an operating system of a computer system having computer resources, the operating system operative to control the computer resources, the 3D interface comprising:

means for enabling a user generating camera motion to interact with the operating system;

means for providing at least one screen display image of a 3D virtual scene including a simulated three-dimensional representation of at least a portion of the computer resources; and means for monitoring said camera motion and determining based on said camera motion which of said computer resources are visible in said display image.

* * * * *